US 12,011,976 B2

(12) United States Patent
Halfon et al.

(10) Patent No.: US 12,011,976 B2
(45) Date of Patent: Jun. 18, 2024

(54) GLAZING ASSEMBLY AND FORMING METHOD

(71) Applicant: JAGUAR LAND ROVER LIMITED, Coventry (GB)

(72) Inventors: Guy Halfon, Coventry (GB); Rob Wright, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 452 days.

(21) Appl. No.: 17/272,329

(22) PCT Filed: Aug. 27, 2019

(86) PCT No.: PCT/EP2019/072745
§ 371 (c)(1),
(2) Date: Feb. 28, 2021

(87) PCT Pub. No.: WO2020/043677
PCT Pub. Date: Mar. 5, 2020

(65) Prior Publication Data
US 2021/0188054 A1  Jun. 24, 2021

(30) Foreign Application Priority Data
Aug. 29, 2018 (GB) ..................................... 1813996

(51) Int. Cl.
*B60J 10/26* (2016.01)
*B29C 45/14* (2006.01)
(Continued)

(52) U.S. Cl.
CPC ......... *B60J 1/006* (2013.01); *B29C 45/14311* (2013.01); *B29C 45/14434* (2013.01);
(Continued)

(58) Field of Classification Search
None
See application file for complete search history.

(56) References Cited

U.S. PATENT DOCUMENTS 4,339,488 A * 7/1982 Brokmann ............. A47C 23/26
428/140
4,477,115 A * 10/1984 Asakura .................. B60J 10/21
296/180.1
(Continued)

FOREIGN PATENT DOCUMENTS

CN        104149267 A     11/2014
DE    102016116289 A1     8/2017
(Continued)

OTHER PUBLICATIONS

Machine translation of CN 104149267 (Year: 2023).*
Combined Search and Examination Report corresponding to Application No. GB1813996.4, dated Jan. 31, 2019, 8 pages.
(Continued)

Primary Examiner — Alexander S Thomas
(74) Attorney, Agent, or Firm — Reising Ethington P.C.

(57) ABSTRACT

Aspects of the present invention relate to a glazing assembly (1) for a vehicle (2). The glazing assembly (1) includes a glazing element (10), a finisher component (11) and a connector (14). The glazing element (10) has an inner surface (10A) and an outer surface (10B); the finisher component (11) has an inner surface (12A) and an outer surface (12B). A portion of the glazing element inner surface (10A) forms a first encapsulation area (A1); and a portion of the finisher component inner surface (12A) forms a second encapsulation area (A2). The finisher component (11) is connected to the glazing element (10) by the connector (14) which is composed of an encapsulation material which encapsulates the first encapsulation area (A1) and the second encapsulation area (A2). The resulting glazing assembly (1)

(Continued)

has a substantially continuous outer surface. The present invention also relates to an encapsulated assembly (1) for an exterior of a vehicle (2). Furthermore, the present invention relates to methods of forming a glazing assembly (1); and an encapsulated assembly (1).

15 Claims, 7 Drawing Sheets

(51) Int. Cl.
*B60J 1/00* (2006.01)
*B60J 1/10* (2006.01)
*B60J 10/70* (2016.01)
*B60R 13/06* (2006.01)
*B29L 31/26* (2006.01)
*B29L 31/30* (2006.01)

(52) U.S. Cl.
CPC ........... *B29C 45/14508* (2013.01); *B60J 1/10* (2013.01); *B60J 10/70* (2016.02); *B60R 13/06* (2013.01); *B29C 2045/14459* (2013.01); *B29C 2045/14516* (2013.01); *B29L 2031/26* (2013.01); *B29L 2031/3052* (2013.01); *B60J 10/26* (2016.02); *Y10T 428/197* (2015.01)

(56) References Cited

U.S. PATENT DOCUMENTS

| 2008/0107857 | A1 | 5/2008 | Sbrana |
| 2009/0304970 | A1 | 12/2009 | Imaizumi |
| 2011/0042848 | A1 | 2/2011 | Ash |
| 2017/0136860 | A1 | 5/2017 | Zhou et al. |

FOREIGN PATENT DOCUMENTS

| EP | 1293387 A2 | 3/2003 |
| GB | 2093106 A | 8/1982 |
| JP | S6345012 A | 2/1988 |
| JP | 2008006918 A | 1/2008 |
| JP | 2012171392 A | 9/2012 |
| JP | 2015107717 A | 6/2015 |
| WO | 2010106868 A1 | 9/2010 |
| WO | 2017148635 A1 | 9/2017 |

OTHER PUBLICATIONS

International Search Report corresponding to International Application No. PCT/EP2019/072745, dated Nov. 5, 2019, 6 pages.
Written Opinion corresponding to International Application No. PCT/EP2019/072745, dated Nov. 5, 2019, 5 pages.

* cited by examiner

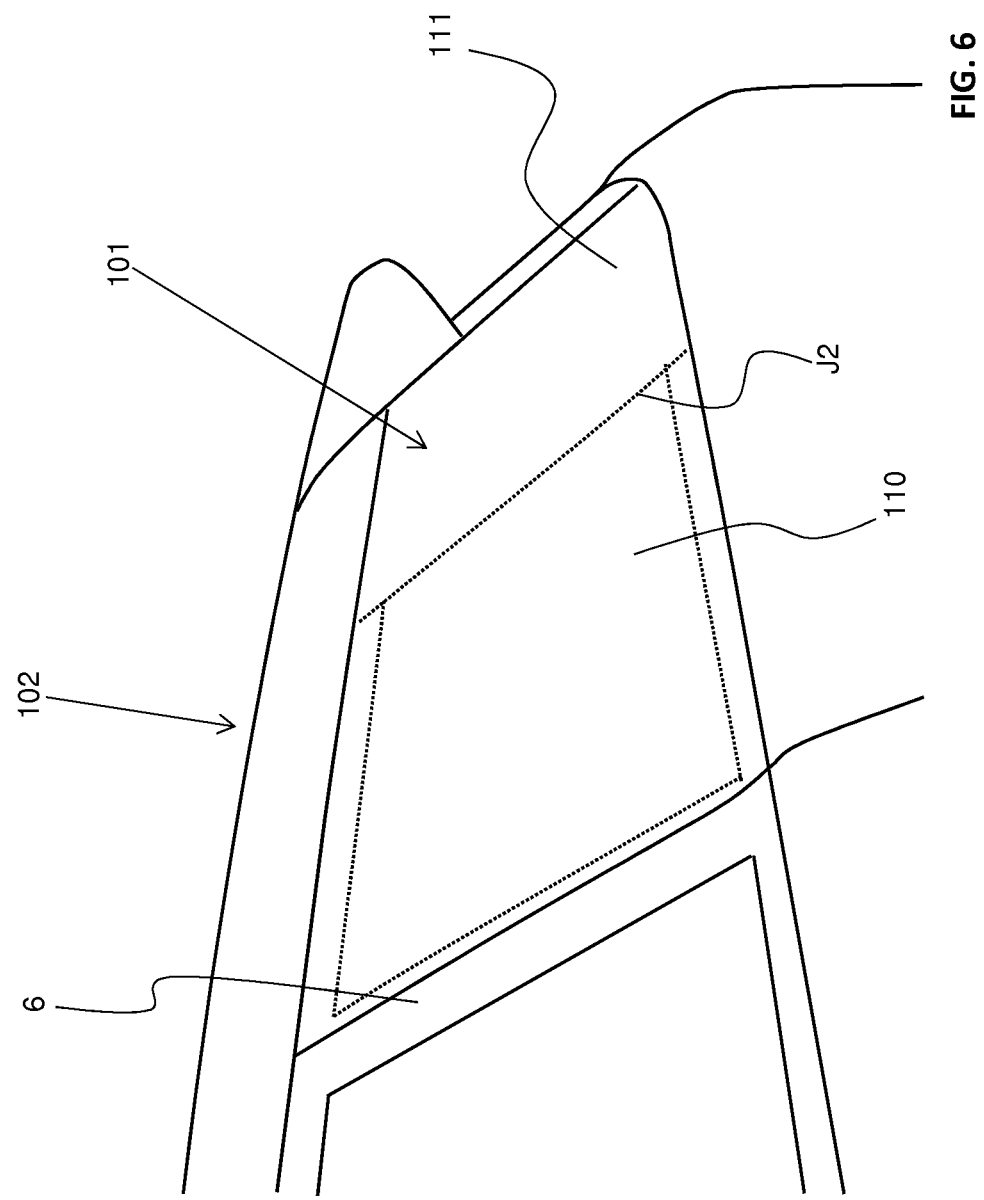

GLAZING ASSEMBLY AND FORMING METHOD

TECHNICAL FIELD

The present disclosure relates to a glazing assembly and forming method. Aspects of the invention relate to a glazing assembly, an encapsulated assembly, a method of forming a glazing assembly, and a method of forming an encapsulated assembly.

BACKGROUND

It is known to provide a vehicle with a finisher component to form part of an exterior surface thereof. In certain designs, the finisher component may be located alongside a glazing panel. The finisher component and the glazing panel are typically fitted as separate components. The glazing panel may be fitted to a body of the vehicle, for example using an adhesive and/or a mechanical fastener. The finisher component may then be fitted alongside the glazing panel. The finisher component may be fastened to the vehicle body using mechanical fasteners, such as blind clips. The resulting joint between the glazing panel and the finisher component is visible and there is typically a slight step/offset between the glazing panel and the finisher component.

A perspective view of a known glazing assembly 101 on a vehicle 102 is shown in FIG. 6 by way of example. The glazing assembly 101 comprises multiple pieces which are fitted to the vehicle 102 as separate components. In particular, the glazing assembly 101 comprises a glazing element 110 and a finisher component 111. A join line J2 formed between the glazing element 110 and the finisher component 111 is represented by dashed lines in FIG. 4.

It is an aim of the present invention to address one or more of the disadvantages associated with the prior art.

SUMMARY OF THE INVENTION

Aspects and embodiments of the invention provide a glazing assembly, an encapsulated assembly and a method of forming a glazing assembly as claimed in the appended claims According to an aspect of the present invention there is provided a glazing assembly for a vehicle, the glazing assembly comprising:
  a glazing element having an inner surface and an outer surface, wherein a portion of the glazing element inner surface forms a first encapsulation area; and
  a finisher component having an inner surface and an outer surface, wherein a portion of the finisher component inner surface forms a second encapsulation area;
  the finisher component being connected to the glazing element by a connector composed of an encapsulation material which encapsulates the first encapsulation area and the second encapsulation area such that the glazing assembly comprises a substantially continuous outer surface. The encapsulation material bonds to the first encapsulation area and to the second encapsulation area, thereby fixedly connecting the glazing element and the finisher component. The glazing assembly is pre-assembled for installation on the vehicle. The glazing element outer surface and the finisher component outer surface form an outer surface of the vehicle.

The glazing assembly outer surface is at least substantially continuous. Thus, at least in certain embodiments, the glazing assembly outer surface is at least substantially free from discontinuities or interruptions, such as a step change in profile. The resulting glazing assembly may comprise a seamless joint between the glazing element and the finisher component.

The glazing assembly outer surface may be planar. Alternatively, the glazing assembly outer surface may be curved. For example, the glazing assembly outer surface may be curved in one or more direction.

At least in certain embodiments, the connector forms a water-tight seal between the glazing element and the finisher component.

The first encapsulation area is formed on the glazing element inner surface. At least in certain embodiments, the connector does not extend over the glazing element outer surface. Alternatively, or in addition, the connector does not extend over the finisher component outer surface.

The finisher component may comprise a stabilising member. The stabilising member may extend from the finisher component inner surface and form at least a portion of the second encapsulation area.

The stabilising member may be spaced apart from the glazing element inner surface. At least a portion of the connector may be disposed between the stabilising member and the glazing element inner surface.

The stabilising member may extend substantially parallel to the glazing element inner surface. The stabilising member may comprise a central longitudinal axis which extends substantially parallel to the glazing element inner surface which forms the first encapsulation area.

The second encapsulation area may be formed on two opposing sides of the stabilising member.

The glazing element could comprise interlocking means for interlocking with the connector. The interlocking means may comprise one or more of the following: an aperture, a channel, a recess and a protuberance. The interlocking means may be formed in the first encapsulation area.

The stabilising member may comprise interlocking means for interlocking with the connector. The interlocking means may comprise one or more of the following: an aperture, a channel, a recess and a protuberance. The interlocking means may be formed in the second encapsulation area. Alternatively, or in addition, the stabilising member may comprise a (negative) taper angle for interlocking with the connector.

The connector may form a joint between the glazing element and the finisher component. The joint may have an outer surface which forms a continuation of the glazing element outer surface and the finisher component outer surface. The join outer surface may be planar or curved.

The connector may comprise an elongate section disposed between the glazing element and the finisher component. The elongate section may comprise an outer surface which is profiled to form a continuation of at least one of the glazing element outer surface and the finisher component outer surface. The elongate section outer surface may, for example, comprise a convex curve or a planar surface. The elongate section outer surface may be moulded to form a continuation of at least one of the glazing element outer surface and the finisher component outer surface.

The glazing element and the finisher component may abut against each other. Alternatively, the glazing element and the finisher component may be spaced apart from each other.

The encapsulation material may be substantially rigid or inflexible. Alternatively, the encapsulation material may resiliently deformable to enable relative movement of the glazing element and the finisher component. The encapsulation material may, for example, comprise or consist of an elastomer. The encapsulation material may enable limited relative movement of the glazing element and the finisher component.

According to a further aspect of the present invention there is provided a vehicle comprising a glazing assembly as described herein.

According to a further aspect of the present invention there is provided an encapsulated assembly for an exterior of a vehicle, the encapsulated assembly comprising:

a first component having a first inner surface and a first outer surface, wherein a portion of the first inner surface forms a first encapsulation area; and a second component having a second inner surface and a second outer surface, wherein a portion of the second inner surface forms a second encapsulation area;

the first component and the second component being connected to each other by a connector, the connector being composed of an encapsulation material which encapsulates the first encapsulation area and the second encapsulation area such that the encapsulated assembly comprises a substantially continuous outer surface;

wherein the second component comprises a stabilising member forming the second encapsulation area. The stabilising member may extend from the second inner surface.

The first component and the second component may be formed from different materials. The first component may be formed of metal. The first component may be formed of a plastics material.

According to a further aspect of the present invention there is provided a method of forming a glazing assembly for a vehicle, the glazing assembly comprising a glazing element having an inner surface and an outer surface; and a finisher component having an inner surface and an outer surface; the method comprising:

locating the glazing element and the finisher component in a mould;

introducing an encapsulation material into the mould to form a connector to connect the finisher component to the glazing element, the encapsulation material encapsulating a first encapsulation area formed on the glazing element inner surface and a second encapsulation area formed on the finisher component inner surface such that the glazing assembly comprises a substantially continuous outer surface. At least in certain embodiments, the mould may define the outer surface of the connector. Thus, the mould may be profiled to form the substantially continuous outer surface of the glazing assembly.

The finisher component may comprise a stabilising member extending from the finisher component inner surface. The method may comprise introducing the encapsulation material into the mould to encapsulate at least a portion of the stabilising member.

The stabilising member may be spaced apart from the glazing element inner surface. The encapsulation material may be introduced between the stabilising member and the glazing element inner surface.

The stabilising member may be spaced apart from the glazing element. The encapsulation material may form an elongate section of the connector extending between the stabilising member and the glazing element.

The mould may form an outer surface of the connector.

The mould may be profiled such that the connector outer surface forms a continuation of at least one of the glazing element outer surface and the finisher component outer surface.

The glazing element and the finisher component abut against each other in the mould.

According to a further aspect of the present invention there is provided an encapsulated assembly for an exterior of a vehicle, the encapsulated assembly comprising:

a first component having a first inner surface and a first outer surface, wherein a portion of the first inner surface forms a first encapsulation area; and a second component having a second inner surface and a second outer surface, wherein a portion of the second inner surface forms a second encapsulation area;

the first component and the second component being connected to each other by a connector, the connector being composed of an encapsulation material which encapsulates the first encapsulation area and the second encapsulation area such that the encapsulated assembly comprises a substantially continuous outer surface;

wherein the second component comprises a stabilising member extending from the second inner surface and forming the second encapsulation area.

The first component and the second component may be formed from different materials.

According to a further aspect of the present invention there is provided a method of forming an encapsulated assembly for an exterior of a vehicle, the encapsulated assembly comprising a first component having a first inner surface and a first outer surface; and a second component having a second inner surface and a second outer surface; the method comprising:

locating the first component and the second component in a mould;

introducing an encapsulation material into the mould to form a connector to connect the first component to the second component, the encapsulation material encapsulating a first encapsulation area formed on the first inner surface and a second encapsulation area formed on the second inner surface such that the encapsulated assembly comprises a substantially continuous outer surface. The mould may form an outer surface of the connector.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 6 shows a perspective view of a vehicle incorporating a known two-piece glazing assembly.

DETAILED DESCRIPTION

Figure 1:
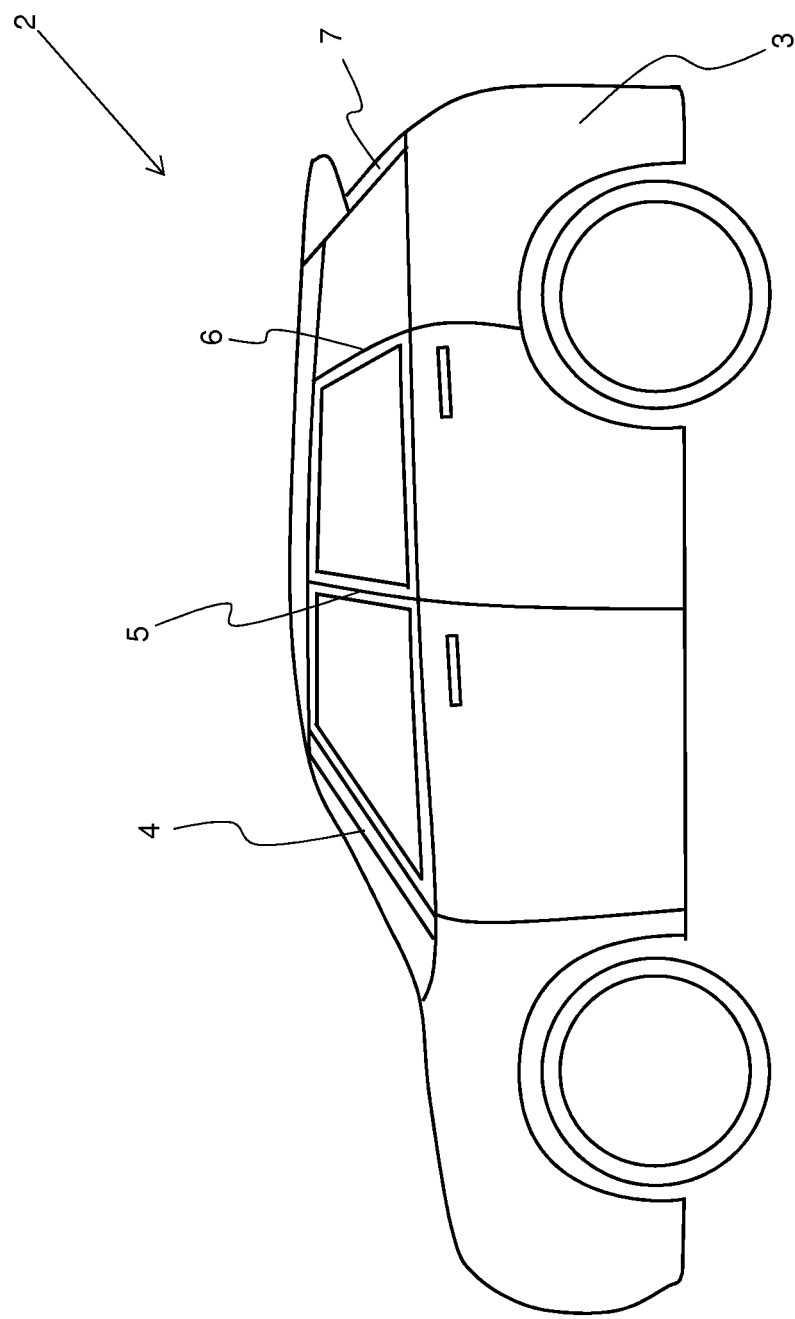
FIG. 1 shows a schematic representation of a vehicle incorporating a glazing assembly in accordance with an embodiment of the present invention.
Figure 2:
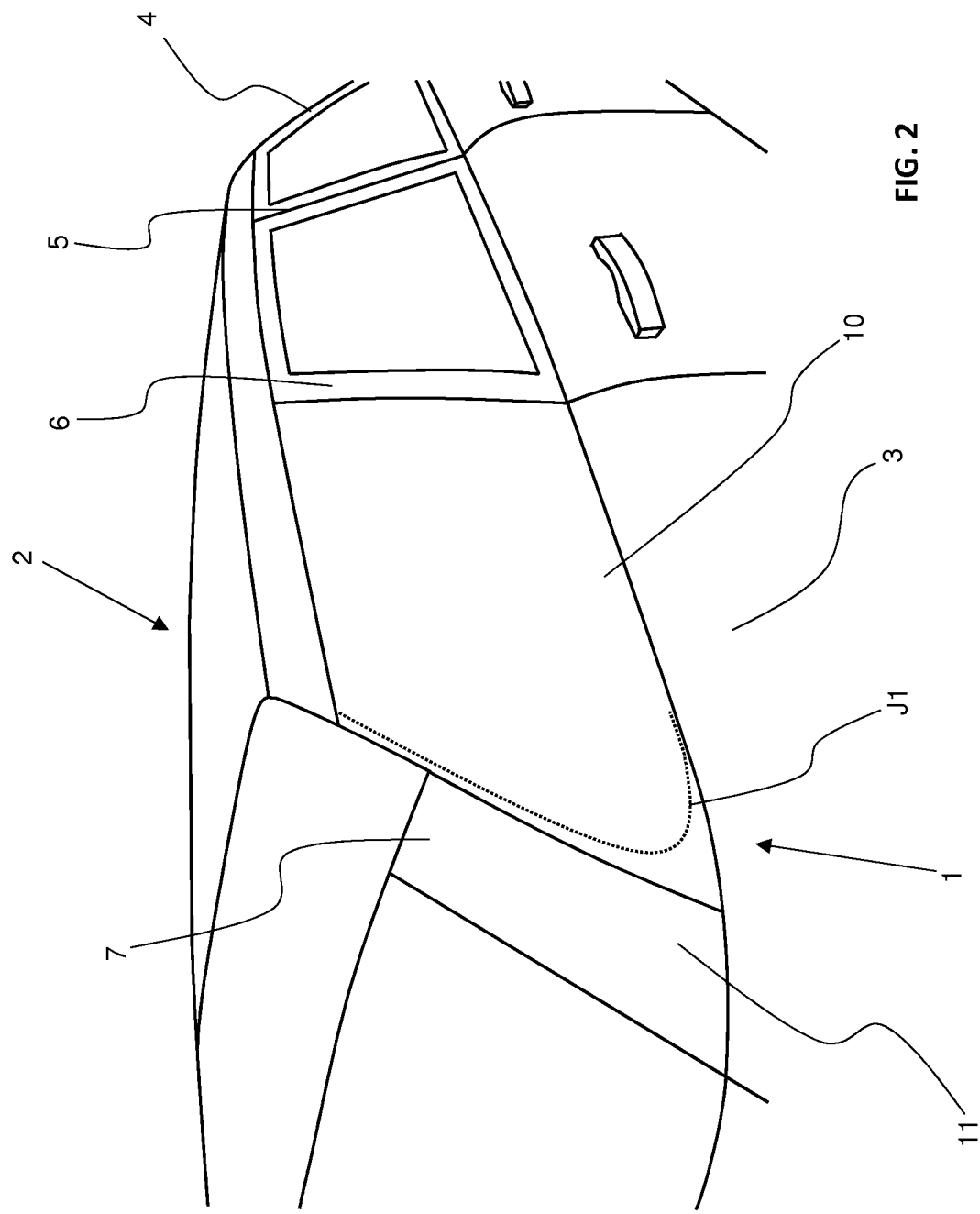
FIG. 2 shows a perspective view of a vehicle incorporating the glazing assembly illustrated in FIG. 1.

A glazing assembly 1 in accordance with an embodiment of the present invention is described herein with reference to the accompanying Figures. As shown in FIGS. 1 and 2, the glazing assembly 1 is installed on a vehicle 2. In the present embodiment, the vehicle 2 is an automobile. In particular, the vehicle 2 is a sports utility vehicle (SUV). It will be understood that the glazing assembly 1 may be employed in a vehicle 2 having other body styles, for example a saloon, sports, coupe, station wagon, estate, shooting brake or utility. Furthermore, it will be understood that the glazing assembly 1 may be installed in other types of vehicle, such as a train.

As shown in FIG. 1, the vehicle 2 comprises a vehicle body (denoted generally by the reference numeral 3) comprising an A-pillar 4, a B-pillar 5, a C-pillar 6 and a D-pillar 7. The glazing assembly 1 is a rear quarter glazing assembly and is installed in a rear quarter of the vehicle 2 so as to extend between the C-pillar 6 and the D-pillar 7. The glazing assembly 1 comprises a glazing element 10 and a finisher component 11. The finisher component 11 forms an exterior surface of the vehicle 2 (also known as an A-surface).

The glazing element 10 consists of a glass panel and forms a rear quarter window of the vehicle 2 when the glazing assembly 1 is installed. The rear quarter window in the present embodiment is a fixed window (i.e. a window which cannot be opened), but aspects of the present invention could be implemented in a window which can open. The glazing element 10 is fastened to the vehicle body 3 using conventional fastening means (not shown), such as an adhesive and/or one or more mechanical fastener(s). The glazing element 10 has an inner surface 10A and an outer surface 10B. The outer surface 10B of the glazing element 10 forms part of the exterior surface of the vehicle 2 when the glazing assembly 1 is fitted.

Figure 3:
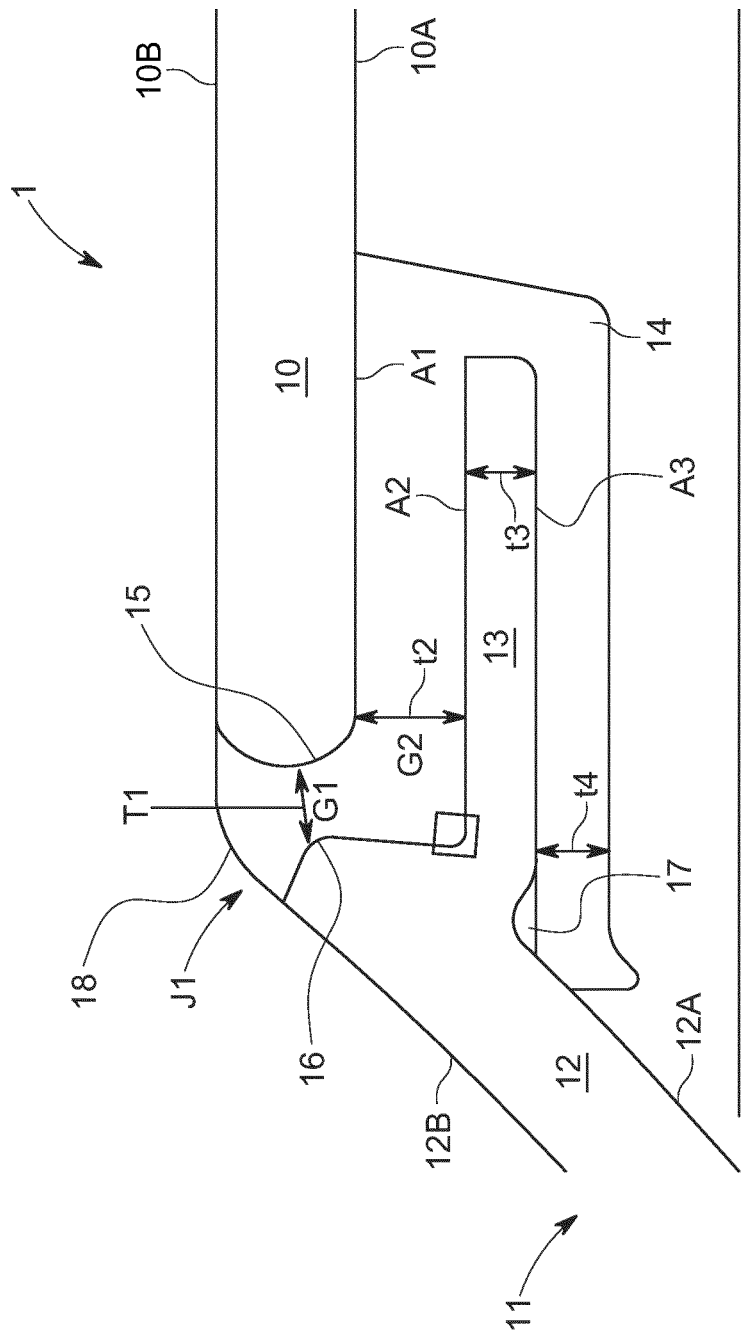
FIG. 3 shows a sectional view through the glazing assembly shown in FIG. 2.

The finisher component 11 comprises a D-pillar finisher which forms an exterior surface of the D-pillar 7 of the vehicle body 3. The finisher component 11 is moulded from a plastics material, for example by an injection-moulding process. The D-pillar finisher is made of a thermoplastic Polymethyl methacrylate (P.M.M.A) in the present embodiment. As shown in FIG. 3, the finisher component 11 comprises a finisher panel 12, a stabilising member 13 and a connector 14. The finisher panel 12 comprises an inner surface 12A and an outer surface 12B. The outer surface 12B of the finisher panel 12 forms a part of the exterior surface of the vehicle 2. The outer surface 12B of the finisher panel 12 may have a gloss or matt finish. The stabilising member 13 is provided to reinforce the connection between the glazing component 10 and the finisher component 11. The stabilising member 13 projects from the inner surface 12A of the finisher panel 12 and extends alongside the glazing component 10 to form an overlap. As shown in FIG. 3, the stabilising member 13 is spaced apart from the inner surface 10A of the glazing element 10. The finisher panel 12 and the stabilising member 13 are formed integrally such that the finisher component 11 has a one-piece composition. In a variant, the finisher panel 12 and the stabilising member 13 could be formed separately and then joined, for example by fastening or mounting the stabilising member 13 to the finisher panel 12.

The connector 14 fixedly connects the glazing element 10 and the finisher component 11. As described herein, the connector 14 is moulded around the stabilising member 13 and at least partially encapsulates the stabilising member 13. The connector 14 retains the glazing element 10 and the finisher component 11 in a substantially fixed position and orientation relative to each other. The glazing assembly 1 may be fitted to the vehicle body 3 as a single, homogeneous component. The connector 14 may be at least substantially rigid or inflexible. In the present embodiment, the connector 14 enables limited relative movement of the glazing element 10 and the finisher component 11 to facilitate fitting of the glazing assembly 1. The connector 14 could be formed from an elastomeric compound.

The connector 14 forms a joint J1 (represented by a dashed line in FIG. 2) between the glazing element 10 and the finisher component 11. The joint J1 is elongated along the length of the boundary between the glazing element 10 and the finisher component 11. A sectional view of the joint J1 is shown in FIG. 3 and the joint J1 extends out of the plane of the page. The joint J1 comprises an outer surface 18 having a curved profile which forms a continuation of the outer surfaces 10B, 12B of the glazing element 10 and the finisher panel 12. The outer surface 18 of the joint J1 thereby forms a substantially continuous (i.e. substantially uninterrupted) exterior surface for the glazing assembly 1. The continuous outer surface 18 forms a seamless joint J1 which is less visible than prior art arrangements. The glazing element 10 has a first edge 15; and the finisher component 11 has a second edge 16. The first and second edges 15, 16 each have a convex profile in transverse section. The joint J1 is formed such that the first and second edges 15, 16 oppose each other in a spaced apart arrangement. In the present embodiment, a substantially uniform first gap G1 is formed between the first and second edges 15, 16 along said joint J1. In a variant, the joint J1 may be formed such that the first and second edges 15, 16 abut against each other. The first and second edges 15, 16 could have cooperating profiles to form the joint J1, for example cooperating convex and concave profiles. As shown in FIG. 2, in the present embodiment the joint J1 comprises a linear section and a curved section in side elevation. It will be understood that the joint J1 may have other profiles.

The stabilising member 13 extends continuously along the length of the joint J1 and reinforces the connection between the glazing element 10 and the finisher component 11. The stabilising member 13 extends across the joint J1 to form an overlap with the glazing element 10. As shown in FIG. 3, the stabilising member 13 is spaced apart from the inner surface 10A of the glazing element 10. In the present embodiment, the stabilising member 13 extends substantially parallel to the inner surface 10A of the glazing element 10. A second gap G2 is formed between the stabilising member 13 and the inner surface 10A of the glazing element 10. As described herein, the connector 14 is formed in the second gap G2. One or more aperture may be formed in the stabilising member 13 to form a mechanical interlock between the stabilising member 13 and the connector 14. As shown in FIG. 3, a channel 17 is formed at a base of the stabilising member 13 to form a keyed interlock with the connector 14.

Figure 4:
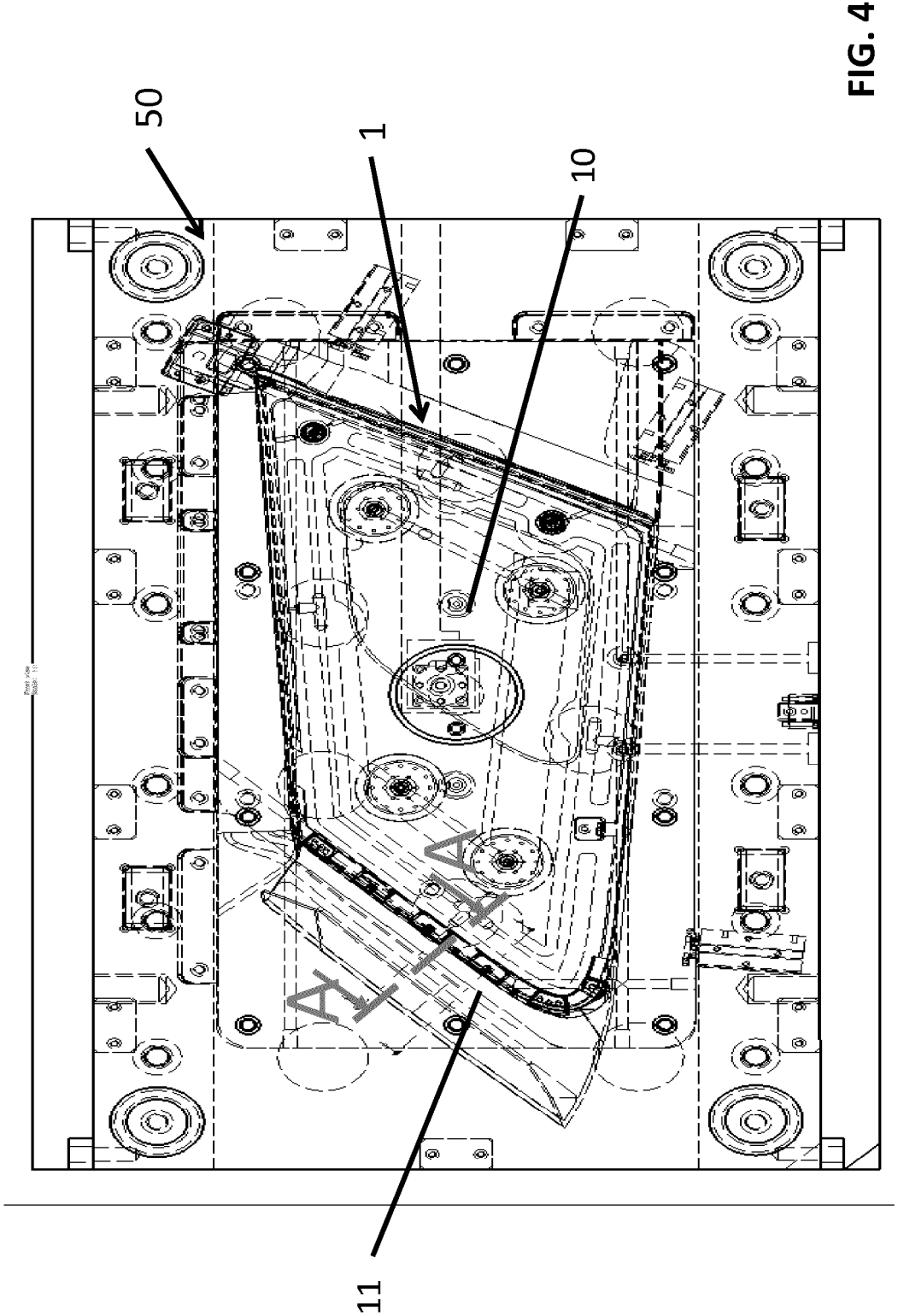
FIG. 4 shows a plan elevation of a mould for forming a connector to join the glazing element and the finisher component of the glazing assembly.
Figure 5A:
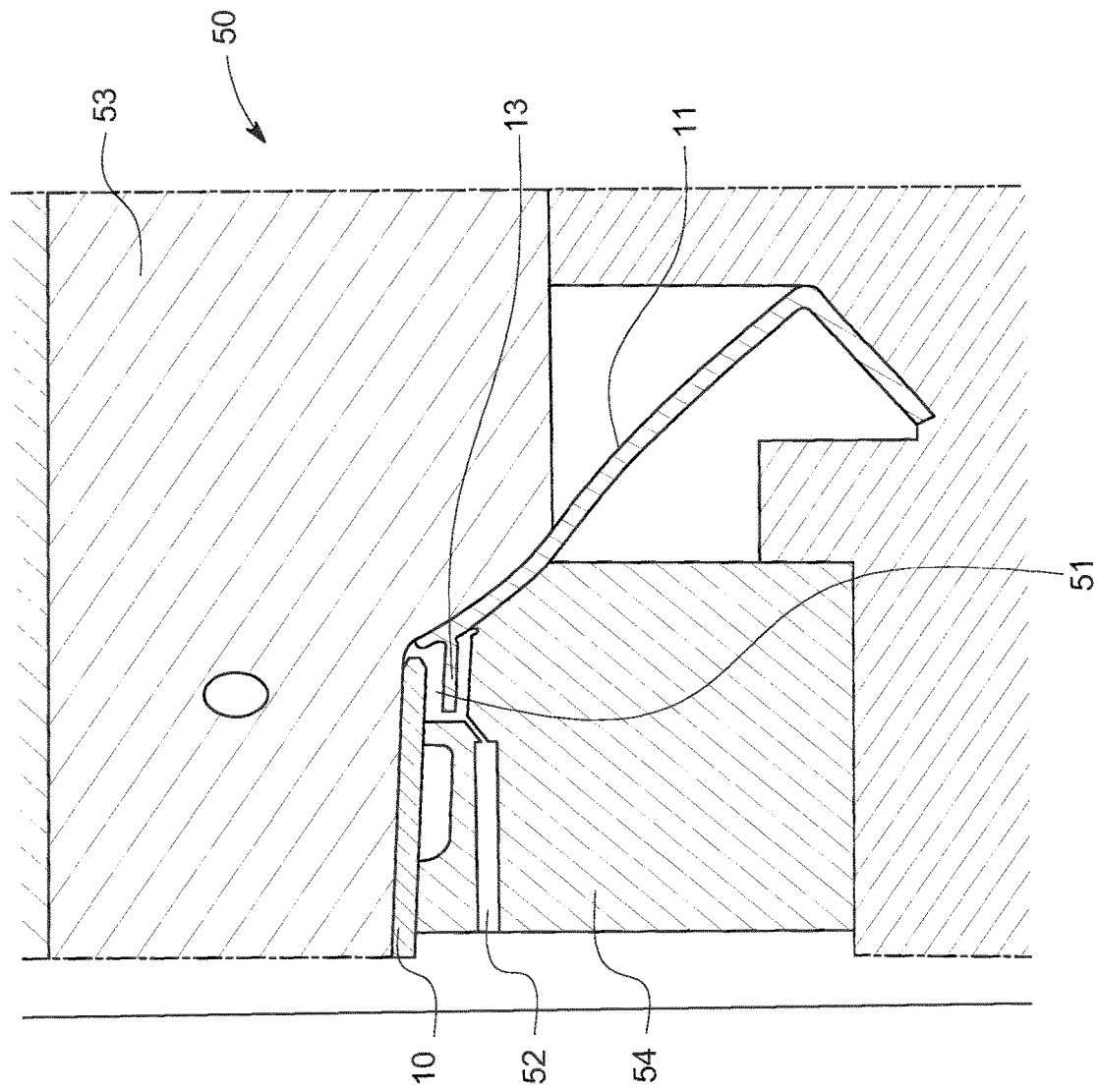
FIG. 5A shows a sectional view of the mould shown in FIG. 4 prior to introduction of an encapsulation material.

The connector 14 is moulded in situ such that it is formed around the glazing element 10 and the finisher component 11. The glazing element 10 comprises a first encapsulation area A1 formed on the inner surface 10A. The stabilising member 13 comprises opposing surfaces which form respective second and third encapsulation areas A2, A3. The connector 14 is moulded onto the glazing element 10 and the finisher component 11 so as to form a bond directly with each of the first, second and third encapsulation areas A1-A3, thereby connecting the glazing element 10 and the finisher component 11. A plan elevation of a mould 50 for forming the connector 14 is shown in FIG. 4. The mould 50 forms a mould cavity 51 in fluid communication with an injection port 52 through which an encapsulation material is injected to form the connector 14. The mould 50 in the present embodiment comprises first and second mould members 53, 54 for forming the mould cavity 51. At least one of the first and second mould members 53, 54 is movable to open and close the mould 50. A sectional view of the mould 50 along the section line A-A of FIG. 4 is shown in FIGS. 5A and 5B.

The formation of the connector 14 will now be described with reference to FIGS. 5A and 5B. The mould 50 is opened and the glazing element 10 and the finisher component 11 are located in the mould 50 in a desired position and orientation relative to each other. The first and second mould members 53, 54 are brought together to close the mould 50. The first and second mould members 53, 54 clamp the glazing element 10 and the finisher component 11 in position. The glazing element 10 and the finisher component 11 are supported in the mould 50 spaced apart from each other. The first and second gaps G1, G2 are thereby maintained between the glazing element 10 and the finisher component 11. The glazing element 10 and the finisher component 11 are held in this position by the first and second mould members 53, 54. The mould 50 forms the mould cavity 51 around the glazing element 10 and the finisher component 11 in the shape of the connector 14. The first, second and third encapsulation areas A1-A3 are open to an interior of the mould cavity 51.

Figure 5B:
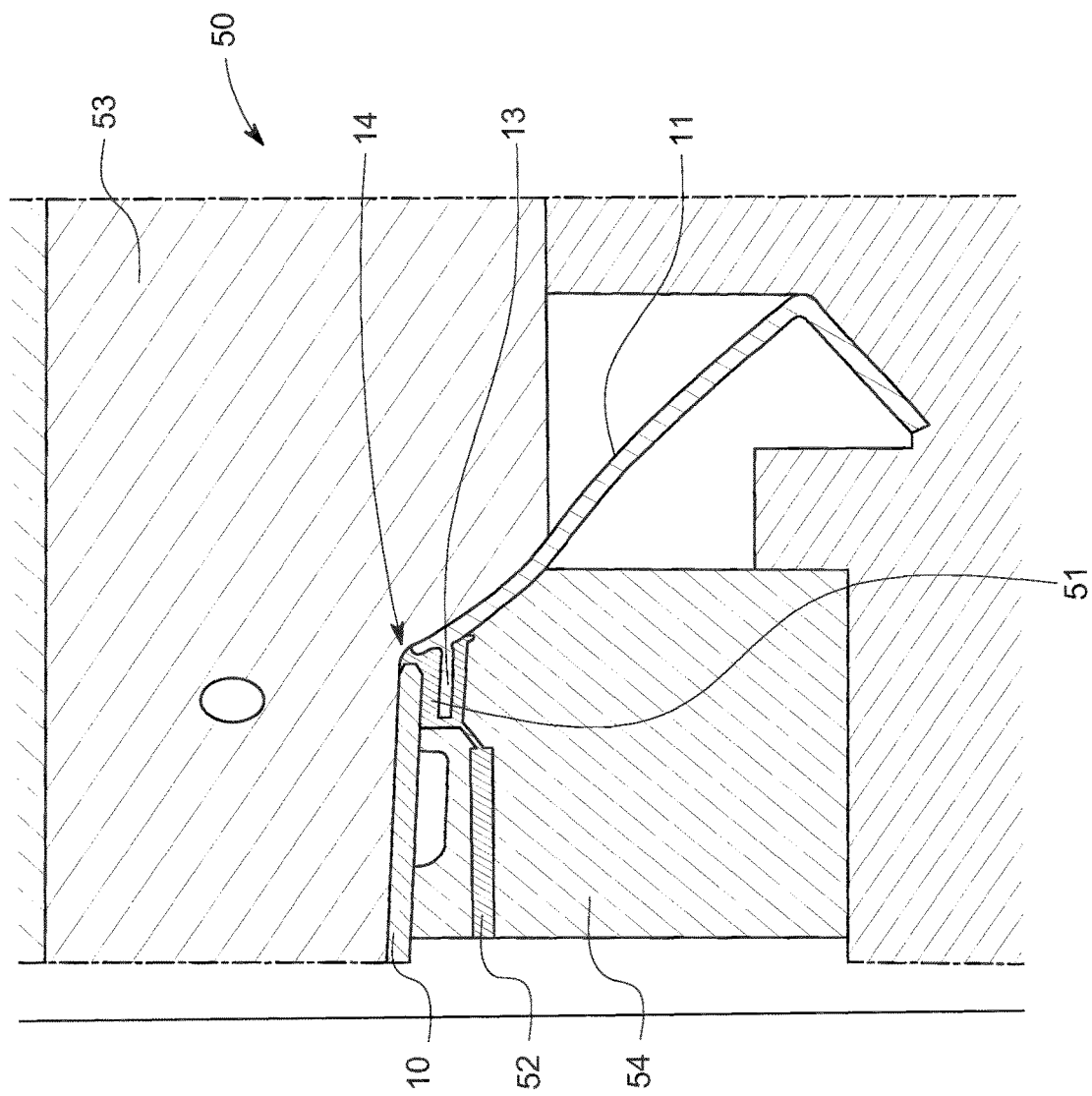
FIG. 5B shows a sectional view of the mould shown in FIG. 4 after introduction of the encapsulation material to form the connector.

As illustrated in FIG. 5B, the encapsulating material (or a tertiary material) is introduced into the mould cavity through the injection port 52. The encapsulating material may, for example, comprise a thermoplastic elastomer (TPE), sometimes referred to as a thermoplastic rubber. The thermoplastic elastomer may provide both thermoplastic and elastomeric properties, for example enable moderate elongation. The thermoplastic elastomer typically has a low viscosity which enables injection at relatively low pressures. The encapsulation material fills the mould cavity 51 and at least substantially covers the first, second and third encapsulation areas A1-A3. The encapsulation material fills the first and second gaps G1, G2 formed between the glazing element 10 and the finisher component 11, thereby forming the joint J1. The mould cavity 51 is profiled to form the outer surface 18 of the joint J1 as a continuation of the outer surface 10B of the glazing element 10 and the outer surface 12B of the finisher panel 12. Thus, the outer surface of the glazing assembly 1 (as defined by the outer surfaces 10B, 12B and the outer surface 18) is at least substantially continuous and is at least substantially free from surface interruptions or discontinuities. The encapsulating material is cured to form the connector 14 which is bonded to each of the first, second and third encapsulation areas A1-A3. The mould is then opened and the glazing assembly 1 removed as a single component.

The glazing assembly 1 is pre-assembled for example to facilitate installation on the vehicle 2. The glazing assembly 1 may be transported and manipulated as a single component, rather than a separate glazing element 10 and finisher component 11. This facilitates fitting of the glazing assembly 1 to the vehicle body 3, for example on the assembly line. The glazing assembly 1 may be removed from the vehicle body 3 as a single component, for example to replace a damaged unit.

It will be appreciated that various changes and modifications can be made to the present invention without departing from the scope of the present application.

The surface of the glazing element 10 may optionally be etched, either mechanically or chemically, to provide a keyed surface finish in the first encapsulation area A1. Alternatively, or in addition, the finisher component 11 may be formed such that one or both of the second and third encapsulation areas A2, A3 may have a textured or roughened surface finish for enhancing bonding.

The glazing assembly 1 has been described herein with particular reference to a D-pillar finisher assembly. It will be understood that the glazing assembly 1 could be used in other applications. The glazing assembly 1 could be used in conjunction with a front windshield, for example to form an A-pillar finisher assembly. Alternatively, the glazing assembly 1 could be used in conjunction with a rear windshield, for example to integrate a finisher component into a trunk door.

The method and apparatus described herein is not limited to glazing assemblies. For example, the glazing panel could be replaced with a plastic element, for example a transparent plastic element. The transparent plastic element may form a cover of a light on the vehicle, for example a front headlight, a tail light or a signalling light.

The invention claimed is:

1. A glazing assembly for a vehicle, the glazing assembly comprising:
   a glazing element having an inner surface and an outer surface, wherein a portion of the glazing element inner surface forms a first encapsulation area; and
   a finisher component having an inner surface and an outer surface, wherein a portion of the finisher component inner surface forms a second encapsulation area;
   the finisher component being connected to the glazing element by a connector composed of an encapsulation material which encapsulates the first encapsulation area and the second encapsulation area such that the glazing assembly comprises a substantially continuous outer surface,
   wherein an outer surface of the connector forms part of the substantially continuous outer surface of the glazing assembly,
   wherein the substantially continuous outer surface of the glazing assembly is free from discontinuities or interruptions, and
   wherein the finisher component comprises a stabilizing member extending from the finisher component inner surface and forming at least a portion of the second encapsulation area.

2. A glazing assembly according to claim 1, wherein the stabilizing member is spaced apart from the glazing element inner surface; and at least a portion of the connector is disposed between the stabilizing member and the glazing element inner surface.

3. A glazing assembly according to claim 1, wherein the stabilizing member extends substantially parallel to the glazing element inner surface.

4. A glazing assembly according to claim 1, wherein the second encapsulation area is formed on two opposing sides of the stabilizing member.

5. A glazing assembly according to claim 1, wherein the stabilizing member is interlocked with the connector.

6. A glazing assembly according to claim 1, wherein the connector comprises an elongate section disposed between the glazing element and the finisher component, the elongate section having an outer surface which is profiled to form a continuation of at least one of the glazing element outer surface and the finisher component outer surface.

7. A glazing assembly according to claim 6, wherein the elongate section outer surface is molded to form the continuation of at least one of the glazing element outer surface and the finisher component outer surface.

8. A glazing assembly as claimed in claim 1, wherein the encapsulation material is resiliently deformable to enable relative movement of the glazing element and the finisher component.

9. A vehicle comprising a glazing assembly according to claim 1.

10. An encapsulated assembly for an exterior of a vehicle, the encapsulated assembly comprising:
- a first component having a first inner surface and a first outer surface, wherein a portion of the first inner surface forms a first encapsulation area; and
- a second component having a second inner surface and a second outer surface, wherein a portion of the second inner surface forms a second encapsulation area;
- the first component and the second component being connected to each other by a connector, the connector being composed of an encapsulation material which encapsulates the first encapsulation area and the second encapsulation area such that the encapsulated assembly comprises a substantially continuous outer surface;
- wherein the second component comprises a stabilizing member extending from the second inner surface and forming at least a portion of the second encapsulation area,
- wherein an outer surface of the connector forms part of the substantially continuous outer surface of the encapsulated assembly, and
- wherein the substantially continuous outer surface of the encapsulated assembly is free from discontinuities or interruptions.

11. A method of forming a glazing assembly for a vehicle, the glazing assembly comprising a glazing element having an inner surface and an outer surface; and a finisher component having an inner surface, a stabilizing member extending from the finisher component inner surface, and an outer surface; the method comprising:
- locating the glazing element and the finisher component in a mold;
- introducing an encapsulation material into the mold to form a connector to connect the finisher component to the glazing element and to encapsulate at least a portion of the stabilizing member, the encapsulation material encapsulating a first encapsulation area formed on the glazing element inner surface and a second encapsulation area formed on the finisher component inner surface such that the glazing assembly comprises a substantially continuous outer surface formed in part by an outer surface of the connector and free from discontinuities or interruptions.

12. A method according to claim 11, wherein the stabilizing member is spaced apart from the glazing element inner surface; and the encapsulation material is introduced between the stabilizing member and the glazing element inner surface.

13. A method according to claim 11, wherein the stabilizing member is spaced apart from the glazing element; and the encapsulation material forms an elongate section of the connector extending between the stabilizing member and the glazing element.

14. A method according to claim 11, wherein the mold forms the outer surface of the connector.

15. A method according to claim 14, wherein the mold is profiled such that the connector outer surface forms a continuation of at least one of the glazing element outer surface and the finisher component outer surface.

* * * * *